United States Patent
Örtegren et al.

(10) Patent No.: US 6,668,981 B2
(45) Date of Patent: Dec. 30, 2003

(54) DISC BRAKE COMPRISING A BRAKE MECHANISM

(75) Inventors: Anders Örtegren, Landskrona (SE); Stefan Sandberg, Lomma (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 09/865,325

(22) Filed: May 25, 2001

(65) Prior Publication Data

US 2002/0023807 A1 Feb. 28, 2002

(30) Foreign Application Priority Data

May 31, 2000 (SE) .............................................. 0002058
Oct. 3, 2000 (SE) .............................................. 0003546

(51) Int. Cl.$^7$ ............................................. F16D 55/14
(52) U.S. Cl. ...................... 188/72.2; 188/72.9; 188/71.8
(58) Field of Search ............................ 188/73.31, 72.7, 188/71.9, 72.2, 72.9, 71.7, 71.8, 196 R, 196 V

(56) References Cited

U.S. PATENT DOCUMENTS

| | | | |
|---|---|---|---|
| 3,517,777 A | 6/1970 | Beller | |
| 3,724,616 A | 4/1973 | Burnett | |
| 3,734,243 A | 5/1973 | Girauldon | |

(List continued on next page.)

FOREIGN PATENT DOCUMENTS

| | | |
|---|---|---|
| DE | 3610569 | 10/1987 |
| DE | 3348359 | 5/1991 |
| DE | 195 15 063 | 4/1995 |
| EP | 0 182 336 B1 | 11/1985 |
| EP | 0182336 | 7/1987 |
| EP | 0145535 | 11/1987 |
| EP | 0271864 | 5/1989 |
| EP | 0436909 | 7/1991 |
| EP | 0478917 | 6/1992 |
| FR | 2306372 | 8/1978 |
| GB | 2102088 | 7/1981 |
| GB | 2 090 355 | 12/1981 |
| SU | 1657070 | 12/1986 |
| WO | WO96/12900 | 5/1996 |

OTHER PUBLICATIONS

A Comparative Overview of Air Disc Brake Designs—SAE Update on Air Disc Brakes Feb., 1982.
Proceedings of the Institute of Mechanical Engineers International Conference for Commercial Vehicles Design and Development of Disc Brakes.
Bendix Heavy Vehicle Systems Group brochure listing features of the Bendix Air Disc Brake.
Proceedings of the Institute of Mechanical Engineers International Conference for Commercial Vehicles Design and Development of Disc Brakes.
Bendix Heavy Vehicle Systems Group brochure listing features of the Bendix Air Disc Brake.

*Primary Examiner*—Christopher P. Schwartz
*Assistant Examiner*—Melanie Torres
(74) *Attorney, Agent, or Firm*—St. Onge Steward Johnston & Reens LLC

(57) ABSTRACT

The present invention concerns a disc brake having a brake mechanism. The disc brake comprises a caliper (16) reaching over a brake disc and having a cavity for receiving the brake mechanism. The brake mechanism comprises a bearing bracket (30) received from the inside in an opening (17) of the caliper (16) in the side wall furthest from the brake disc. The brake mechanism comprises an adjuster mechanism (23) an adjustment shaft (40) and a reset shaft (41). Means (24) are provided for transferring movement between the adjuster and reset shafts (40, 41). The adjuster mechanism is actuated by a lever pin (43) on a lever (31) of the brake mechanism and is received in the bearing bracket (30) at assembly.

11 Claims, 7 Drawing Sheets

U.S. PATENT DOCUMENTS

| | | |
|---|---|---|
| 3,741,350 A | 6/1973 | Knapp |
| 3,830,343 A | 8/1974 | Gardner |
| 3,837,437 A | 9/1974 | Martins |
| 3,937,304 A | 2/1976 | Brix |
| 3,967,705 A | 7/1976 | Johannesen |
| 4,018,310 A | 4/1977 | Ritsema |
| 4,071,118 A | 1/1978 | Johannesen |
| 4,109,765 A | 8/1978 | Johannesen |
| 4,184,571 A | 1/1980 | Karasudami |
| 4,222,310 A | 9/1980 | Garrett |
| 4,378,863 A | 4/1983 | Baum |
| 4,465,164 A | 8/1984 | Anderson |
| 4,522,286 A | 6/1985 | Villata |
| 4,681,194 A | 7/1987 | Tsuruta |
| 4,693,341 A | 9/1987 | Drott |
| 4,705,147 A | 11/1987 | Pressaco |
| 4,809,822 A | 3/1989 | Margetts |
| 5,433,298 A | 7/1995 | Antony |
| 5,520,267 A * | 5/1996 | Giering et al. ............. 188/72.7 |
| 5,547,048 A | 8/1996 | Antony |
| 5,568,845 A * | 10/1996 | Baumgartner et al. ..... 188/71.9 |
| 5,590,742 A | 1/1997 | Gutelius |
| 5,664,646 A * | 9/1997 | Bejot et al. .................. 18/71.9 |
| 5,833,035 A | 11/1998 | Severinsson |
| 5,927,445 A | 7/1999 | Bieker |
| 5,960,914 A | 10/1999 | Isai |
| 6,336,686 B2 * | 1/2002 | Thomas et al. ............ 188/72.7 |
| 6,354,407 B1 * | 3/2002 | Heinlein et al. ........... 188/72.7 |

* cited by examiner

DISC BRAKE COMPRISING A BRAKE MECHANISM

CROSS REFERENCE OF PENDING APPLICATIONS

This application claims priority from pending Swedish Patent Application Numbers 0002058-6 filed on May 31, 2000 and 0003546-9 filed on Oct. 3, 2000.

1. Technical Field

The present invention concerns a disc brake comprising a brake mechanism. The brake mechanism is received in a brake caliper. The caliper is furnished with an opening for receiving a bearing bracket of the brake mechanism.

The brake mechanism according to the present invention is primarily intended for a heavy road vehicle but may quite as well be used for a lighter road vehicle or a rail vehicle.

As the brake pads of the disc brake wear the position of the thrust plate or plates are normally altered to compensate for the wear. Without the adjustment of the position there would eventually be an impracticable stroke length of the brake. The position is altered by means of an adjuster mechanism, which takes up possible slack during each brake stroke. Normally there are two thrust units and the slack should be taken up in the same extent by both thrust units. Thus, the movement controlled by the adjuster mechanism has to be synchronized to give the same adjustment of both thrust units and thus avoid uneven wear of the brake pads.

2. Prior Art

It is previously known to have an adjuster mechanism to take up slack of the brake. It is also known to synchronize the controlled movement of the adjuster mechanism between two thrust units.

SUMMARY OF THE INVENTION

The brake mechanism of the present invention comprises a drive means including an adjuster mechanism, as is known in the art. Furthermore the drive means includes two thrust units. The synchronization of the thrust units is given as an additional effect of the drive means. The brake mechanism also includes a bearing bracket. The bearing bracket is to be received from the inside in an opening of the brake caliper. The adjuster mechanism is received in the bearing bracket. The brake caliper is reaching over the brake disc and has a cavity for receiving the brake mechanism.

One object of the present invention is to have a high quality concerning the function of synchronizing the adjustment movements between the two thrust units of the brake mechanism.

A further object is to have a brake mechanism, which is practical concerning maintenance and replacements.

Still a further object is to have an as compact and accurate brake mechanism as possible.

The above objects are achieved by a brake mechanism comprising a bearing bracket received from the inside in an opening of the caliper. The brake mechanism comprises an adjuster mechanism and, adjustment and reset shafts. The adjuster mechanism is actuated by a lever pin on the lever of the brake mechanism actuated by a pneumatic cylinder or the like. The adjuster mechanism is received in the bearing bracket at assembly.

In one embodiment of the invention all the parts giving the synchronization, including the adjuster mechanism are received in the bearing bracket. This means that it is possible to have a distinct hypoid drive. The drive forms one unit with the lever, synchronization shaft and adjuster mechanism.

In a second embodiment of the invention a set of gear wheels are arranged in the bearing bracket as part of the drive means. The set of gear wheels has the additional function of synchronizing the movement between the two thrust units. By using straight-toothed gear wheels there will be no oblique forces at the transfer of torque, whereby resetting of the mechanism will be made easier. Furthermore, the torque limiter of the adjuster mechanism may be smaller.

In a third embodiment of the invention parts giving the synchronization is placed under the cross bar, which gives a more compact mechanism. The driving will take place on sleeves requiring one thrust plate. The plate may be used to make sure that the pressure balance is optimal on pads having a suitable design.

The brake mechanism of the present invention is preferably pneumatically actuated, but it may also be hydraulically or electrically actuated.

Further objects and advantages of the invention will be obvious for a person skilled in the art from reading the description below.

BRIEF DESCRIPTION OF THE DRAWINGS

Embodiments of the invention will be more closely described below as a way of example and by reference to the enclosed FIGS., in which.

DETAILED DESCRIPTION OF PREFERRED EMBODIMENTS

Figure 1:
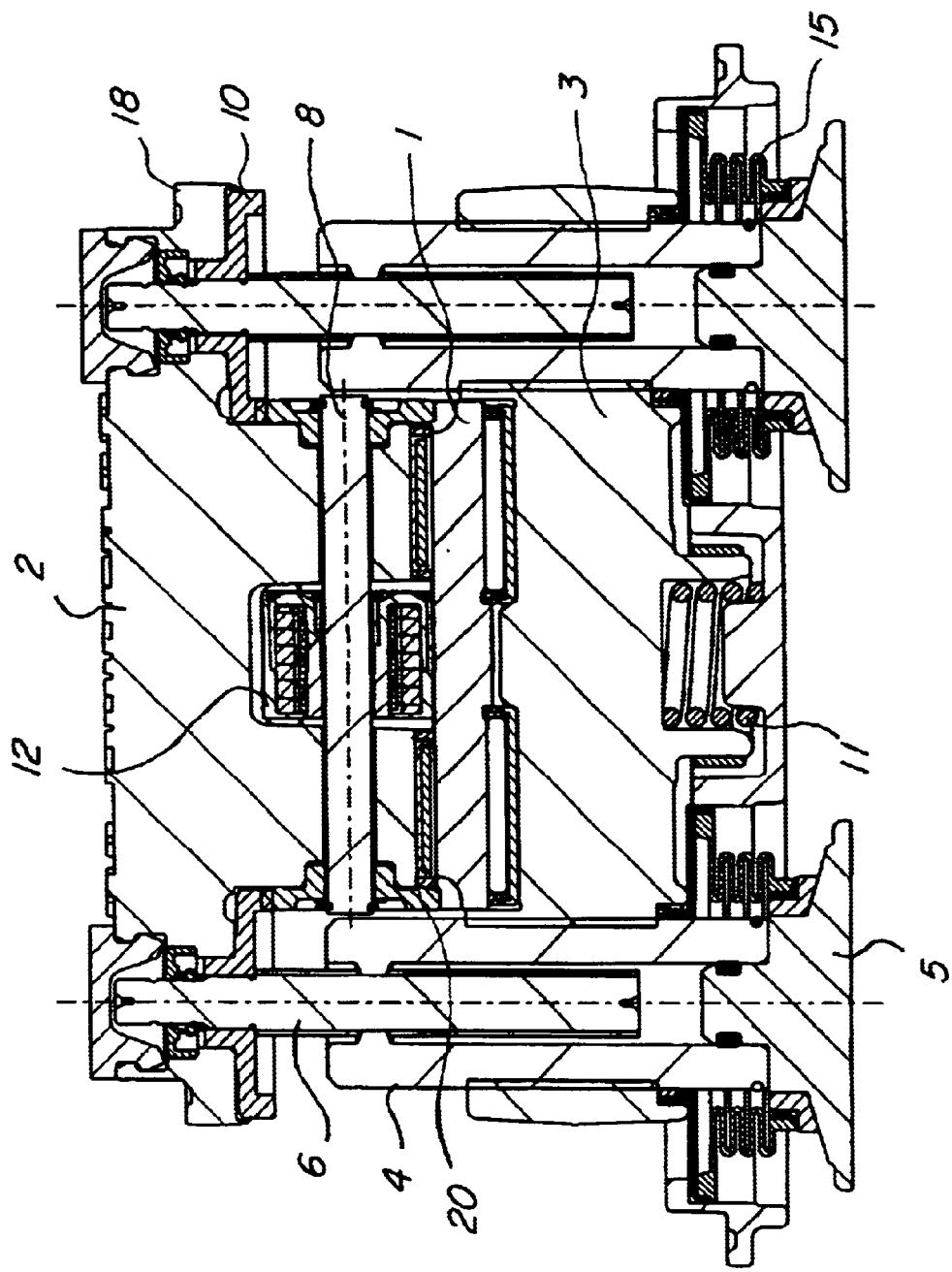
FIG. 1 is a cross section of a brake mechanism according to the invention.
Figure 2:
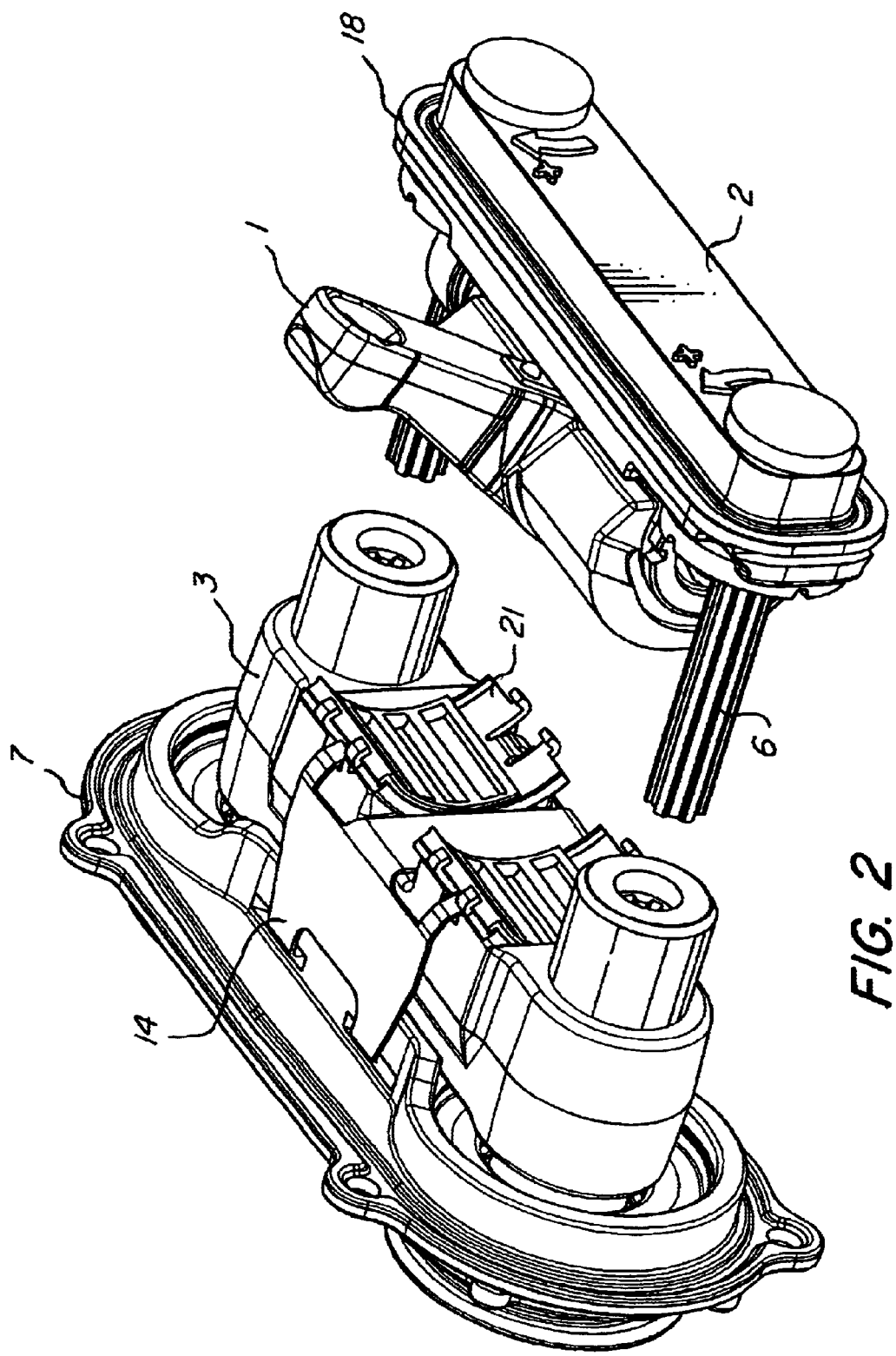
FIG. 2 is a perspective view of the brake mechanism of FIG. 1, showing two units forming the brake mechanism.

The brake mechanism according to the embodiment of FIGS. 1 and 2 comprises a lever 1 mounted in a bearing bracket 2, to be received in an opening 17 of the caliper 16. The lever 1 acts on a cross bar 3. The lever 1 is supported by roller bearings 20, 21 placed in the bearing bracket 2 and the cross bar 3, respectively. In some embodiments the roller bearing of the bearing bracket 2 is replaced by a plain bearing. The cross bar 3 has two threaded openings each receiving an adjustment screw 4. Thus, the adjustment screws 4 are rotatably mounted in the cross bar 3. Each adjustment screw 4 is provided with a thrust plate 5, which is to act on a brake pad holder (not shown) or the like. The brake pad will go into contact with the brake disc during activation of the brake. As is known a further brake pad is arranged on the opposite side of the brake disc. The further brake pad is in a known way brought into contact with the brake disc in that the open caliper 16 is moved at the activation of the brake.

Figure 3:
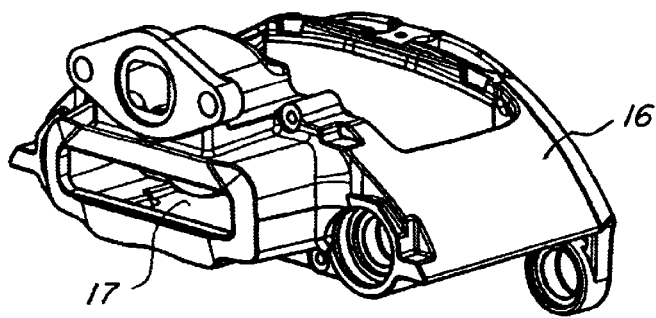
FIG. 3 is an example of a caliper to be used with all the shown embodiments of the brake mechanism.

In FIG. 3 an example of a caliper 16 is shown. The caliper has an opening 17 in the side wall furthest from the brake disc and it has a cavity for receiving the brake mechanism of any of the embodiments described here.

In the bearing bracket 2 two adjustment and reset shafts 6 are mounted. When the brake mechanism is assembled the adjustment and reset shafts 6 will be received inside the adjustment screws 4. The adjustment and reset shafts 6 are axially moveable but non-rotatably connected to the adjustment screws 4. Furthermore, the brake mechanism comprises a cover 7 fixed to the open caliper 16 at assembly.

A synchroniszing shaft 8 is mounted in the bearing bracket 2, having pinions 9 at each end. The pinions 9 are coupled to crown wheels 10 non-rotatably connected to the adjustment and reset shafts 6. The synchronizing shaft 8 carries an adjuster mechanism 12 of known design. A return spring 11 is positioned between the cover 7 and the cross bar 3 in order to bring the brake mechanism back to its rest position. The pinions 9, crown wheels 10, synchronizing shaft 8 and adjuster mechanism 12 synchronize the movements of the adjustment and reset shafts 6.

The brake mechanism forms two units or modules. One unit consists of the lever 1, the pinions 9, the crown wheels 10, the synchronizing shaft 8, the adjuster mechanism 12 and the adjustment and reset shafts 6 all mounted in the bearing bracket 2. In order to keep these parts together as a unit a clip 13 (see FIG. 7) is furnished to hold the lever 1. The cross bar 3, the cover 7, the return spring 11, the adjustment screws 4 and the thrust plates 5 form the second unit of the brake mechanism. The second unit is held together by means of a brace 14.

The adjuster mechanism 12 is arranged on the synchronizing shaft 8, which extends through the adjuster mechanism 12. As stated above either end of the shaft 8 is provided with a pinion 9 meshing with a crown wheel 10 on the adjustment and reset shaft 6. By turning the synchronizing shaft 8 by means of the adjuster mechanism 12 the adjustment and reset shafts will be synchronously turned. This will turn the adjustment screws 4 in the threaded openings of the cross bar 3 and moving them forward in order to compensate for wear of the brake pad. The function of the adjuster mechanism 12 as such is the same as for the adjuster mechanism 23 described more extensive below. The adjuster mechanism 12, 23 is part of the drive means of the brake mechanism. Thus, the synchronizing is an additional function of the drive means.

To protect the brake mechanism from road dirt bellows 15 are placed between the thrust plates 5 and the cover 7. In the shown embodiment the bellows 15 are placed in a heat protection ring.

The bearing bracket 2 is received in an opening 17 of the caliper 16. The opening 17 is placed in the wall of the caliper 16 furthest from the brake disc. Thus, the caliper is of an open design. The bearing bracket 2 has a shoulder 18 abutting the inside of the caliper 16 and thus, the bearing bracket 2 is placed in the opening 17 of the caliper 16 from the inside. The reaction of the clamp force of the brake is transmitted by means of the bearing bracket 2 to the open caliper 16. The force of reaction is transmitted via the shoulder 18 of the bearing bracket 2. As the force of reaction is transmitted by means of the shoulder 18 of the bearing bracket 2 the force is transmitted in a area surrounding the opening 17 of the caliper 16. The bearing bracket 2 is a loaded part of the brake mechanism and, thus, the bearing bracket 2 and its shoulder 18 should have enough strength to transmit the force of reaction. A person skilled in the art realises that the shoulder may be placed in the caliper 16 in stead of the bearing bracket 2, in which case the force of reaction will be transmitted via the edge area of the bearing bracket 2 to the shoulder of the caliper 16.

A sealing is placed between the bearing bracket 2 and the open caliper 16. The sealing between the bearing bracket 2 and the open caliper 16 is received in a groove of the bearing bracket 2. The groove and thus the sealing may be placed in any position axially or radially in the bearing bracket 2. The inside of the open caliper 16 may be machined via said opening 17 of the caliper 16.

The bearing bracket of all the embodiments described in this application co-operates with the caliper in the same way as stated above. Thus, the description of the cooperation between the caliper and the bearing bracket will not be repeated in connection with the description of the other embodiments.

Figure 4:
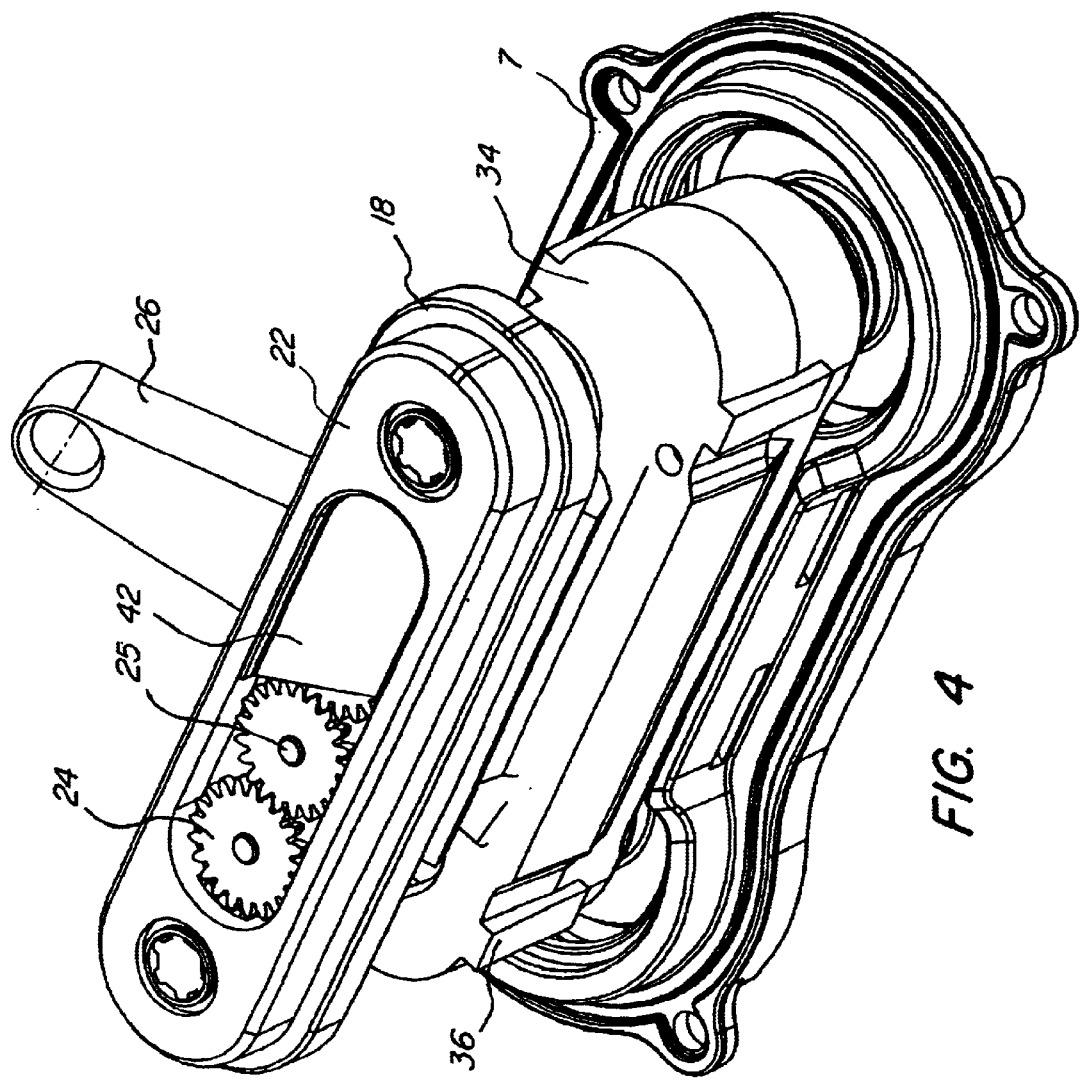
FIG. 4 is a perspective view of a second embodiment of a brake mechanism according to the invention.
Figure 5:
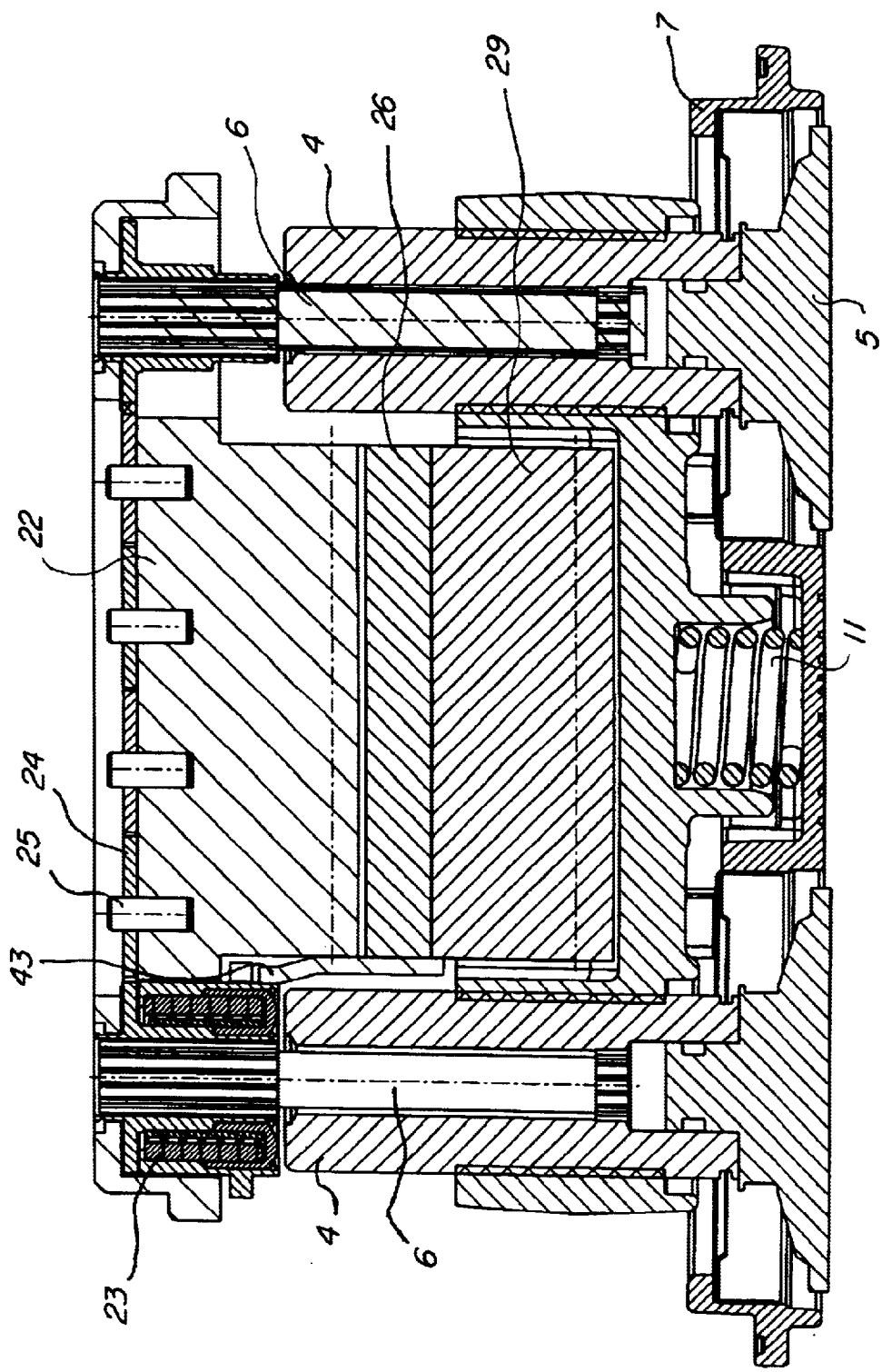
FIG. 5 is a cross section of the brake mechanism of FIG. 4.

In the second embodiment of the brake mechanism according to FIGS. 4 and 5, an adjuster mechanism 23 of known construction is placed on top of one of the adjustment screws 4. The adjuster mechanism 23 is received in the bearing bracket 22. In the bearing bracket 22 a number of gear wheels 24 are placed between gear wheels of the adjustment and reset shafts 6. Thus, the two adjustments and reset shafts 6 are drivingly connected by means of the gear wheels 24. The adjuster mechanism 23 co-operates with the lever 26 by means of a lever pin 43. Each gear wheel is placed on a pin 25 fixed to the bearing bracket 22. The gear wheels 24 are placed under a cover 42 received in the bearing bracket 22. The gear wheels 24 are primarily part of the drive means and the synchronization is given as an additional function. In FIG. 4 the cover 42 is shown partially broken away for clarity. In the shown example there are four gear wheels 24 between the gear wheels of the adjustment and reset shafts 6. A person skilled in the art realises that other numbers of gear wheels may be used.

As in the previous embodiment the lever 26, the bearing bracket 22 and the adjustment and reset shafts 6 form one unit. This unit is joined with a second unit, formed by the other parts of the brake mechanism when the disc brake is assembled.

In this embodiment the lever 26 is supported by means of a plain bearing received in the bearing bracket 22. The lever 26 acts on the cross bar 34 by means of an intermediate part. The intermediate part has the form of a rocker 29 in this embodiment but may have other forms in another embodiments.

Figure 7:
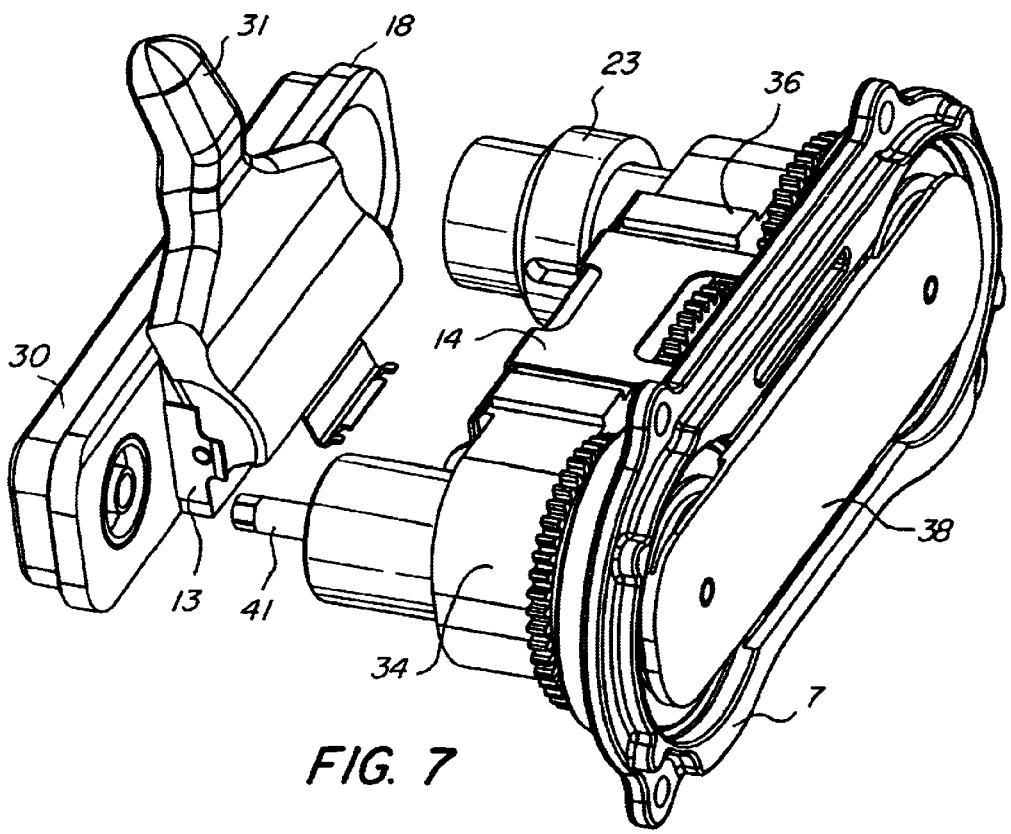
FIG. 7 is a perspective view of the brake mechanism of FIG. 6.
Figure 6:
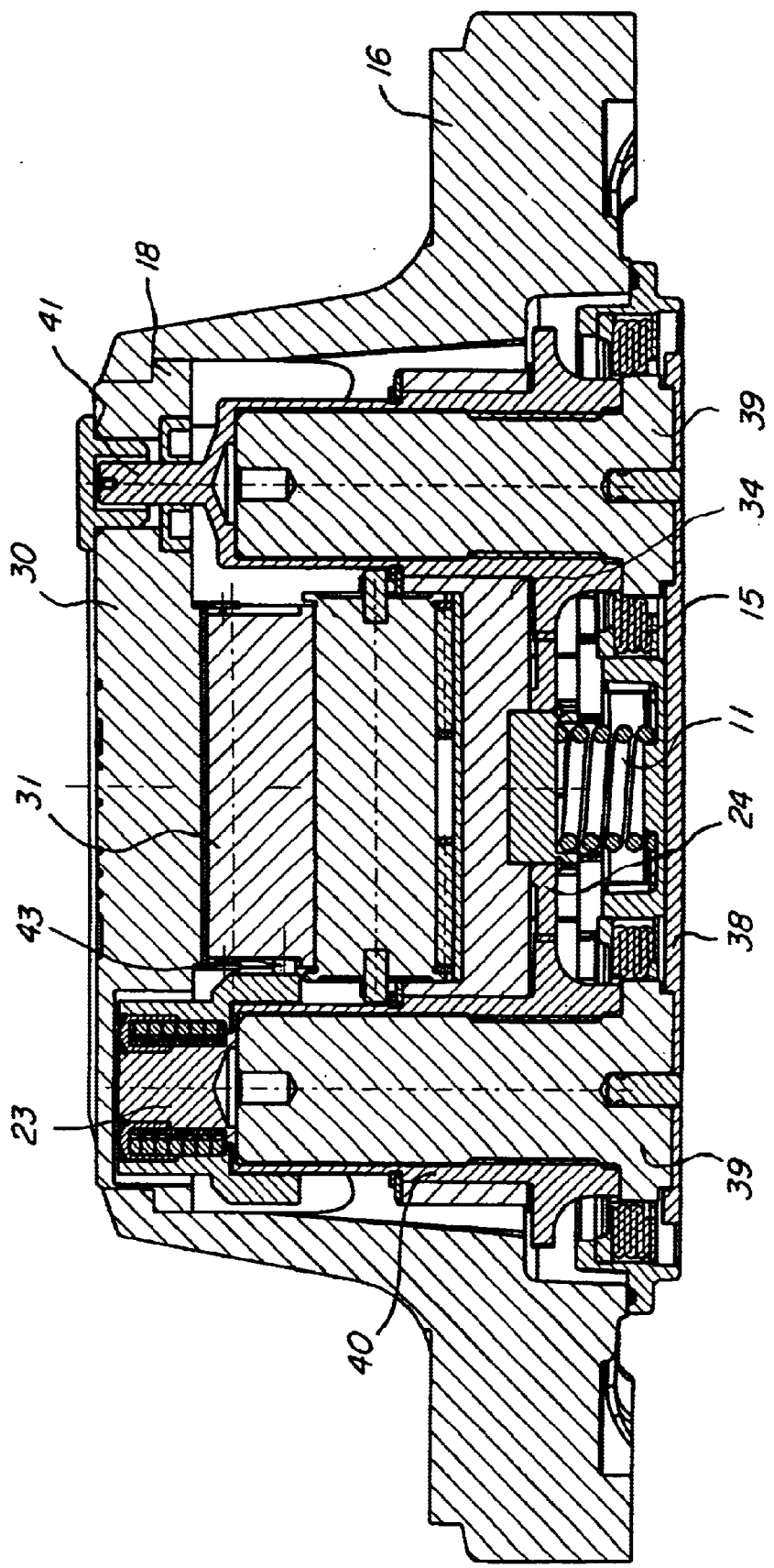
FIG. 6 is a cross section of the caliper and a further alternative embodiment of a brake mechanism of the invention.

In the third embodiment of the brake mechanism according to FIGS. 6 and 7 the lever 31 forms one unit with the bearing bracket 30. The lever is attached to the bearing bracket 30 by means of clips 13. The lever 31 acts on the cross bar 34 by means of an intermediate part in the form of a stud 28. In this embodiment a number of gear wheels 24 are placed in the area between the cross bar 34 and the cover 7.

In this embodiment thrust units are formed connected with a single, common thrust plate 38, which thrust plate 38 acts on a brake pad. The thrust units each comprises a thrust screw 39. The thrust screws 39 have an opening at the bottom, which receives a stud on the thrust plate 38. The studs of the thrust plate 38 and the openings of the thrust screws 39 are formed to lock the thrust screws 39, thus hinder them from rotating.

One of the thrust units is further furnished with the adjuster mechanism 23 as stated above and an adjuster shaft 40. The adjuster mechanism 23 is placed on top of the thrust screw 39 and received in the bearing bracket 30. The other thrust unit is furnished with a reset shaft 41. The shafts 40,41 are drivingly connected by means of a set of gear wheels 24. One gear wheel is integrated with the adjuster shaft 40 and the reset shaft 41, respectively. The set of gear wheels 24 are placed between the cover 7 and the thrust plate 38.

The adjuster mechanism 23 co-operates with the lever 31 by means of a lever pin 43. The shafts 40,41 and the screws 39 of the thrust units may rotate relative each other, which is of importance for adjustment of slack in the disc brake. The shafts 40,41 have the form of sleeves placed on the outside of the thrust screws 39.

Figure 8:
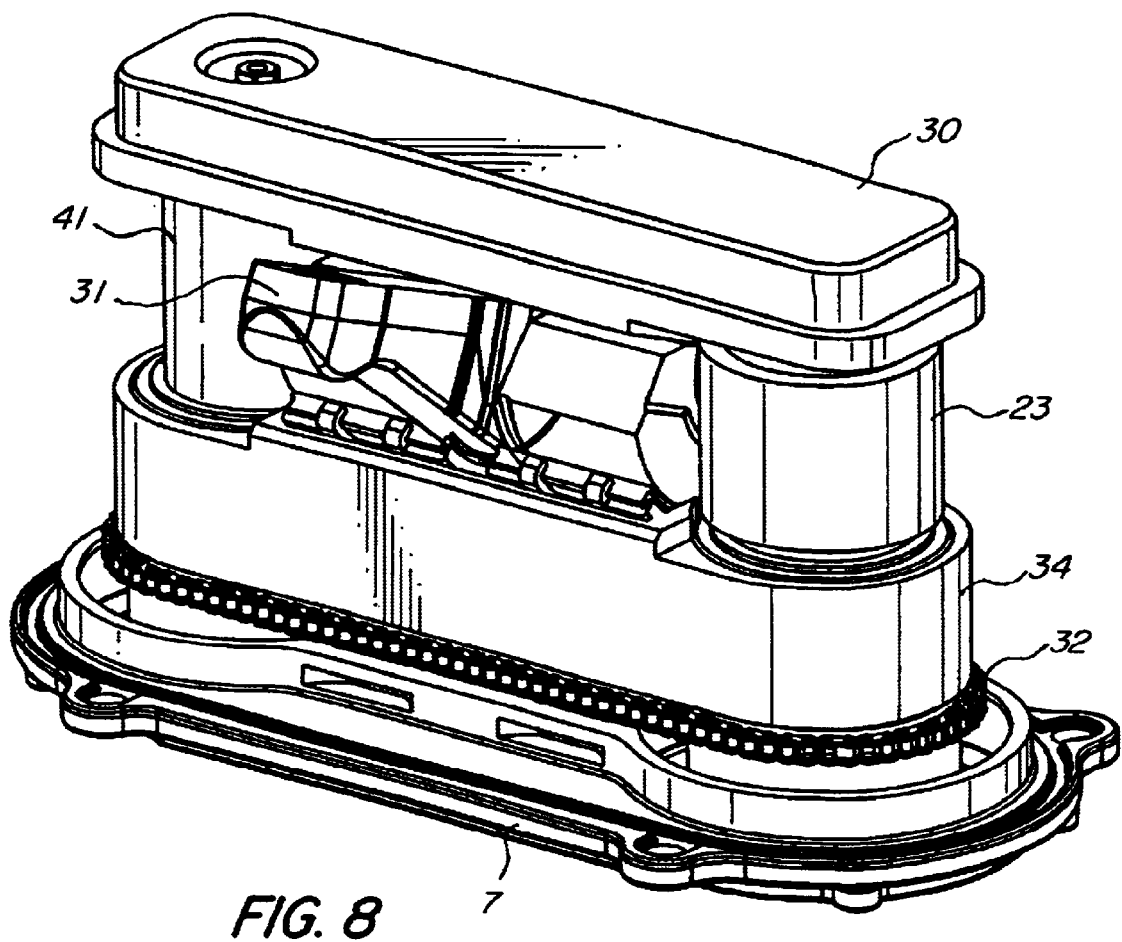
FIG. 8 is a perspective view of a further embodiment of a brake mechanism according to the invention.

In a further embodiment according to the FIG. 8 the set of gear wheels are replaced by a chain 32 placed in the area between the cross bar 3 and the cover 7. The chain 32 co-operates with chain wheels integrated with the adjuster shaft 40 and the reset shaft 41, respectively. In all other aspects the embodiment of FIG. 8 corresponds with the embodiment of FIGS. 6 and 7.

In the embodiments of FIGS. 4 to 8 the cross bar 34 is supported by four protruding parts 36 of the cross bar and the return spring 11 in the cover 7. The protruding parts 36 of the cross bar 34 abut the inside of the open caliper 16. The part of the caliper 16 in contact with the protruding parts of the cross bar 34 is machined to give a smooth surface. The machining is done via the opening 17 of the open caliper 16. The return spring 11 is guided in an opening in the cross bar 34 and acts between the cross bar 34 and the cover 7. The return spring 11 is received in a holder of the cover 7. The cross bar 34 is free to move in the thrust direction along the machined part and in one direction perpendicular to the thrust direction. The latter direction is the tangential direction of the brake discs. In an alternative embodiment the cross bar 34 is guide on guide sleeves (not shown) placed around the screws that are used to fix the cover 7 to the open caliper 16.

The cover 7 is fixed to the open caliper 16 by means of screws. The cover 7 has openings to receive the thrust units. There is a clearance between the cover 7 and the thrust units allowing the thrust units to move in any direction in relation to the cover 7.

The following apply to the embodiments of FIG. 4 to 8. When the brake is activated the lever 26,31 will press the cross bar 34 and thus the thrust plate 38 or plates 5, via the thrust screws 4,39, and the brake pads in direction towards the brake disc (not shown). When the brake pads hits the brake disc, the pads will move in the tangential direction of the brake disc a short distance before the brake pads hit a support (not shown). The movement in the tangential direction of the brake disc is normally not more than a few millimeters. The lever 26,31, the intermediate part 27 if present, the cross bar 34 and the thrust units of the brake mechanism will follow the brake pads in their movement. During this movement the lever 26,31 will slide in the bearing. The cross bar 34 will move in the tangential direction of the brake disc guided by the protruding parts 36 of the cross bar 34 or the guide sleeves. The cover 7 is fixed to the caliper 16 and will not move. The movement between the cross bar 34 and the cover 7 is taken up by the return spring 11. When the brake is released the return spring 11 will bring the cross bar 34 back to its centred position. The lever 26,31, the possible intermediate part 27 and the thrust units will move with the cross bar 34 into the centred position. Thus, the return spring 11 resets the brake mechanism both in the thrust direction and sideways.

The adjuster mechanism 23 is of a known construction and is the same for all the embodiments of FIGS. 4 to 8. When the brake is applied the lever pin 43 of the respective lever 26,31 will act on the adjuster mechanism 23. When the A-distance has been traversed the housing of the adjuster mechanism 23 is forced to rotate anti-clockwise. The A-distance determines the clearance between the brake pads and the brake disc when the brake is not activated.

During an application stroke the A-distance will first be traversed. At the continued application stroke the lever pin 43 will rotate the housing of the adjuster mechanism 23. This rotation will be transferred to the adjustment screw 4 or adjuster shaft 40 depending on the actual embodiment.

In the embodiment of FIGS. 4 and 5 the adjustment screws 4 will rotate in relation to the cross bar 34. Both adjustment screws will be rotated concurrent by means of the set of gear wheels 24. By the rotation the position of each thrust plate 5 in relation to the brake disc will be altered.

In the embodiment of FIGS. 6 to 8 the adjuster shaft 40 will rotate in relation to the thrust screws 39. The adjuster shaft 40 and the reset shaft 41 will be rotated concurrent by means of the set of gear wheels 24. By the rotation of the shafts 40,41 the position of the thrust plate 38 in relation to the brake disc will be altered.

The rotation of the adjustment screws 4 or the adjustment shaft 40 and reset shaft 41, respectively, will decrease the slack, if the slack between the brake pads and the brake disc is excessive of a set control distance. The slack will be decreased until a counter-force and thus a torque is built up when the brake pads engage the brake disc. The force transmission during adjustment occurs by means of a one-way spring drivingly acting between a driving ring and an adjuster hub of the known adjuster mechanism 23. When the brake pads are in engagement with the brake disc, the torque is such that the slip will occur between the housing and the adjustment spring inside the adjuster mechanism 23 at further rotation of the housing.

During the release stroke no torque is transmitted by the one-way spring, which slips in the direction of rotation. If the slack between the brake pads and the brake disc was excessive and this slack has been taken up by rotation of the adjustment screws 4 in relation to the cross bar 34 or the thrust screws 39 in relation to the cross bar 34, this new relative position will be maintained during the release stroke.

At least one of the reset and adjustment shafts 6 and the reset shaft 41, respectively, is furnished with a suitable head to receive a tool used to reset the thrust units when the brake pads are to be replaced. This movement will be transferred to the other reset and adjustment shaft 6 or the adjuster shaft 40, respectively, by means of the set of gear wheels 24 or the chain 32. The respective shaft 6 or 41 is rotated in the normal way until the distance between the thrust plates 5 or plate 38 and the brake disc is sufficient to receive the new brake pads. Then the respective shaft 6 or 41 is rotated in such a way that the distance between the thrust plates 5 or plate 38 and the brake disc corresponds to the desired running clearance. The respective reset shaft 6 or 41 is received in a sealed opening of the bearing bracket 22,30.

A person skilled in the art realises that the different embodiments of the bearing bracket, the lever and the intermediate part may be combined in many different ways.

What is claimed is:

1. A disc brake comprising a brake mechanism, which disc brake comprises a caliper which is reaching over a brake disc and having a cavity for receiving the brake mechanism, characterized in that the brake mechanism comprises a bearing bracket received from the inside in an opening of the caliper in a rear wall furthest from the brake disc; wherein, the bearing bracket has a shoulder which abuts an inner surface surrounding the opening in the rear wall of the caliper when the bearing bracket is received in the opening, such that the brake reaction force is transmitted via the shoulder of the bearing bracket to an area surrounding the opening in the caliper; wherein, a seal is created around the caliper opening between the bearing bracket and the caliper such that the bearing bracket and the caliper cooperate to affect the seal; that the brake mechanism further comprises a drive means including an adjuster mechanism and adjustment and reset shafts; that the adjuster mechanism is actuated by a lever pin on a lever of the brake mechanism; and that the adjuster mechanism is received in the bearing bracket at assembly.

2. The disc brake of claim 1, characterized in that the brake mechanism has means for transferring movement between the adjustment and reset shafts.

3. The disc brake of claim 2, characterized in that means for transferring the movement is placed in the bearing bracket.

4. The disc brake of claim 1, characterized in that the adjuster mechanism is placed in the bearing bracket on a synchronizing shaft connecting the adjustment and reset shafts and which synchronizing shaft goes through the adjuster mechanism and that the adjustment and reset shafts are connected to the synchronizing shaft by means of pinions and crown wheels.

5. The disc brake of claim 2, characterized in that the adjuster mechanism is furnished on an adjustment shaft on top of and adjacent a thrust screw.

6. The disc brake of claim 5, characterized in that the brake mechanism comprises one or more gear wheels placed between and drivingly connected to the adjustment and reset shafts.

7. The disc brake of claim 6, characterized in that the gear wheels are placed in a cavity on top of the bearing bracket on pins received in the bearing bracket and that a cover is furnished to cover the gear wheels of the cavity of the bearing bracket.

8. The disc brake of claim 6, characterized in that the gear wheels are arranged in the area between a cross bar and a cover of the brake mechanism.

9. The disc brake of claim 5, characterized in that the means for transferring the movement comprises a chain.

10. The disc brake of claim 9, characterized in that the chain is arranged in the area between a cross bar and a cover of the brake mechanism.

11. A disc brake comprising a caliper which is reaching over a brake disc and having a cavity for receiving a brake mechanism and an opening in a rear wall furthest from the brake disc, said disc brake comprising a bearing bracket which comprising part of said brake mechanism;

wherein, said bearing bracket is received in the opening from an inside of the cavity;

wherein, the bearing bracket has a shoulder which abuts an inner surface surrounding the opening in the rear wall of the caliper when the bearing bracket is received in the opening, such that the brake reaction force is transmitted via the shoulder of the bearing bracket to an area surrounding the opening in the caliper;

wherein, a seal is created around the caliper opening between the bearing bracket and the caliper such that the bearing bracket and the caliper cooperate to affect the seal; and wherein, said brake mechanism further comprises a drive means including an adjuster mechanism and adjustment and reset shafts; the adjuster mechanism being actuated by a lever pin on a lever of the brake mechanism, and the adjuster mechanism received in the bearing bracket at assembly.

* * * * *